United States Patent
Bass et al.

[11] Patent Number: 5,929,349
[45] Date of Patent: Jul. 27, 1999

[54] INSPECTION TOOL FOR MEASURING WALL THICKNESS OF UNDERGROUND STORAGE TANKS

[75] Inventors: Ronald Marshall Bass; James Donald Haupt, both of Houston; Timothy Caywood Hurley, Katy; Richard Allen Littlefield, Sealy; Paul Alfred Westbrook, Richmond, all of Tex.

[73] Assignee: Shell Oil Company, Houston, Tex.

[21] Appl. No.: 08/916,608

[22] Filed: Aug. 22, 1997

[51] Int. Cl.$^6$ .......................... G01M 19/00; G01H 7/00; G01B 17/02
[52] U.S. Cl. ............................ 73/865.8; 73/597; 33/522; 33/542
[58] Field of Search ................................ 73/865.8, 597, 73/866.5; 33/1 P, 522, 542

[56] References Cited

U.S. PATENT DOCUMENTS

| | | | |
|---|---|---|---|
| 3,460,028 | 8/1969 | Beaver et al. | 73/865.8 |
| 5,370,006 | 12/1994 | Zollinger et al. | 73/865.8 |
| 5,503,033 | 4/1996 | Van Niekerk | 73/865.8 |

*Primary Examiner*—Hezron Williams
*Assistant Examiner*—Chad Soliz

[57] ABSTRACT

The invention comprises a tool which can be inserted through the fill nozzle of an underground fuel storage tank to measure the tank wall thickness. The invention, in a preferred embodiment, uses ultrasonic thickness measurement technology, a well known inspection technique. A special type of ultrasonic probe known as a ZIP (Zero Interface Probe) is required to measure the thickness of fiberglass. A thickness measurement is accomplished by pressing the tool transducers firmly against the inside surface of the fiberglass tank after applying a couplant gel to the surface of the transducers. The tool is connected to an ultrasonic flaw detector, which generates a transmitted pulse and displays the transmitted and reflected pulses on a display screen. The thickness is determined by measuring the time-of-flight (on the display screen) between appropriate pulses. The time-of-flight is proportional to twice the thickness (since the sound pulse must travel to the back wall and return), the proportionality factor being the speed of sound in the fiberglass (speed×time=distance).

13 Claims, 7 Drawing Sheets

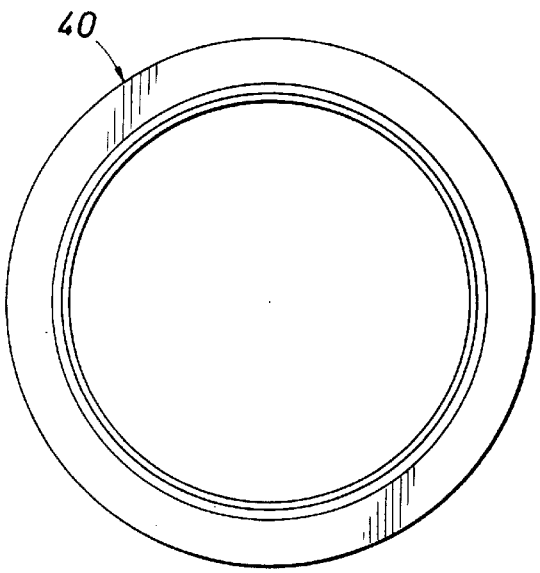
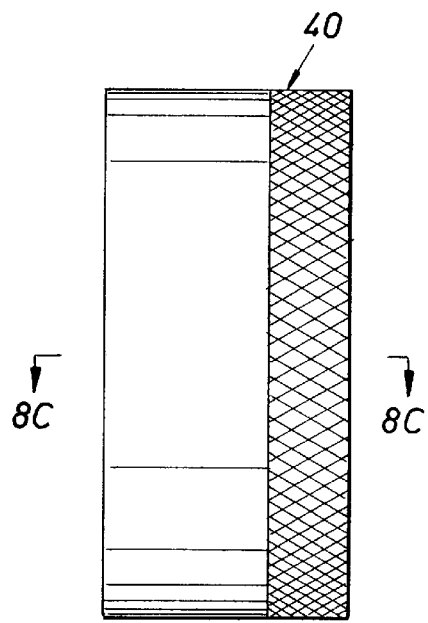
FIG. 8A   FIG. 8B
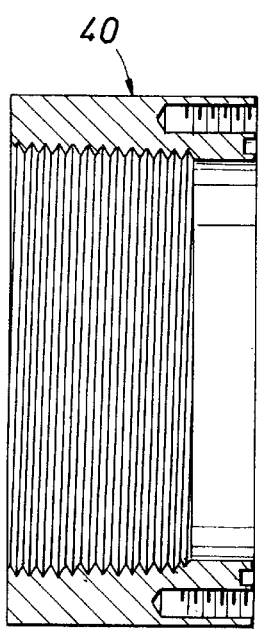
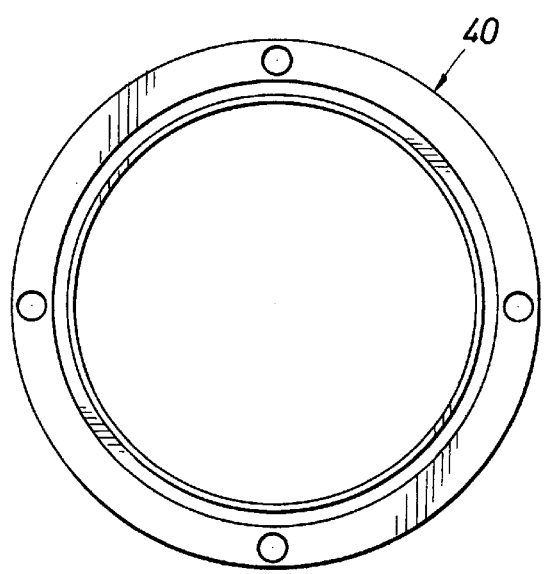
FIG. 8C   FIG. 8D

INSPECTION TOOL FOR MEASURING WALL THICKNESS OF UNDERGROUND STORAGE TANKS

BACKGROUND OF THE INVENTION

1. Field of the Invention

The invention is related to inspection tools for measuring the wall thickness of underground storage tanks, especially fiberglass-reinforced plastic (FRP) storage tanks, and particularly fuel storage tanks.

2. Description of the Prior Art

Zero Interface Probes (ZIP) have been in use for many years, however, previous use has been limited solely to hand-held instruments. There are no known means for the use of such probes where access to humans is denied, i.e., where the probes cannot be hand-held.

SUMMARY OF THE INVENTION

The invention comprises a tool which can be inserted through the fill nozzle of an underground storage tank to measure the tank wall thickness. The invention uses, in a preferred embodiment, ultrasonic thickness measurement technology, a well known inspection technique. A special type of ultrasonic probe known as a ZIP (Zero Interface Probe) is required to measure the thickness of fiberglass. A thickness measurement is accomplished by pressing transducers firmly against the inside surface of the fiberglass tank after applying a couplant gel to the surface of the transducer. The transducer is connected to an ultrasonic flaw detector which generates a transmitted pulse and displays the transmitted and reflected pulses on a screen. The thickness is determined by measuring the time-of-flight on the display screen between the probe delay line/tank interface pulse and the received back wall echo (outside surface) pulse. The time-of-flight is proportional to twice the thickness (since the sound pulse must travel to the back wall and return), the proportionality factor being the speed of sound in the fiberglass (speed×time=distance).

BRIEF DESCRIPTION OF THE DRAWINGS

FIG. 8 shows sectional views of the locking cap which secures the tool to the tank nozzle during measurement operation.

DESCRIPTION OF THE PREFERRED EMBODIMENTS

Figure 1:
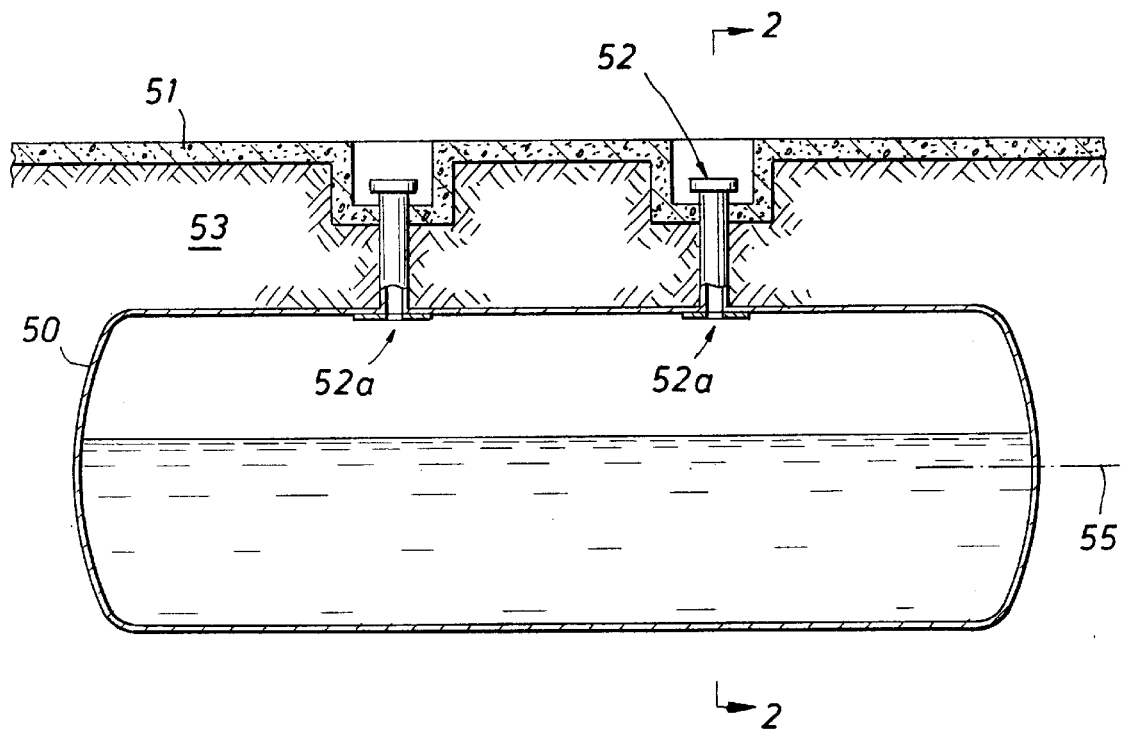
FIG. 1 is a conceptual elevation view of a typical underground storage tank.

As shown in FIG. 1, the tanks 50 are horizontal cylindrical shells about 8 feet in diameter and 25 feet long and are buried typically about 3 to 7 feet below ground level or grade 51. Referring now to FIG. 1, the tanks 50 are filled and emptied through fill nozzles 52 that are about 4 inches in diameter and 3 to 4 feet long. These tanks 50 are subject to stress from below due to ground water, and from above due to the soil overburden 53 and, in some cases, from vehicles passing above the tanks. FRP tank walls take up (absorb) alcohol in the plastic (epoxy resin) and soften. The thickness of the tanks 50 that Assignee has installed range from about 0.22 inches to about 0.27 inches. Laboratory calculations have established that for the thinner range of wall thickness, the softened tanks might experience a reduction in useful life due to the stresses present in the unsupported wall membrane (between reinforcing ribs). It is necessary, therefore, to measure their thickness to determine which tanks have thinner (unacceptable) walls so they can either be reinforced with a liner or replaced, without having to unnecessarily line or replace those having thicker (acceptable) walls. The only access to the interior of the tank 50 is through the fill nozzle 52, or by excavating about 4–6 feet to a buried manway (not shown) where available.

The objective of the invention is to provide a tool 10 (see FIGS. 3 and 4) which can be inserted through the fill nozzle 52 of an underground fuel storage tank 50 to measure the thickness of the tank wall. The invention, in a preferred embodiment, uses ultrasonic thickness measurement technology, a well known inspection technique. A special type of ultrasonic probe (sensor) known as a ZIP (Zero Interface Probe) is required to measure the thickness of fiberglass. The tool 10 is inserted through the fill nozzle 52 with the arms 11, 11a folded parallel to the center shaft 15 (the insertion mode) and locked in place by means of the locking cap 40 (see FIGS. 3 and 8). The length of the fill nozzle 52 has previously been measured in order to position the adjustable tank mounting collar 26 at a point on the center shaft 15 so that the base 30a at the hinged end 30 of the tool 10 is at the center 55a (along the axis 55) of the tank 50 when the locking cap 40 and mounting collar 26 are secured in place. The arms 11, 11a can then be pivoted for measurement (see FIG. 3) by turning the handwheel 21 (to be subsequently described). A thickness measurement is accomplished by pressing the transducers 12, 12a firmly against the inside surface of the fiberglass tank (by a piston to be subsequently described) after applying a couplant gel to the surface of each transducer 12, 12a. The transducers 12, 12a are connected to an ultrasonic flaw detector 16, which generates a transmitted pulse and displays the transmitted and reflected pulses on a display screen. The thickness of the tank 50 wall is determined by measuring the time-of-flight on the display screen between the appropriate pulses. The time-of-flight is proportional to twice the thickness (since the sound pulse must travel to the back wall and return), the proportionality factor being the speed of sound in the fiberglass (speed×time=distance). The ultrasonic flaw detector 16 may be any instrument that will measure flight time of sound pulses such as a Panametrics Epoch III, Model 2300. The couplant gel may be any ultrasonic couplant gel which is not soluble in gasoline, such as ULTRAGEL II® made by Sonotech, Inc.

Figure 7A:
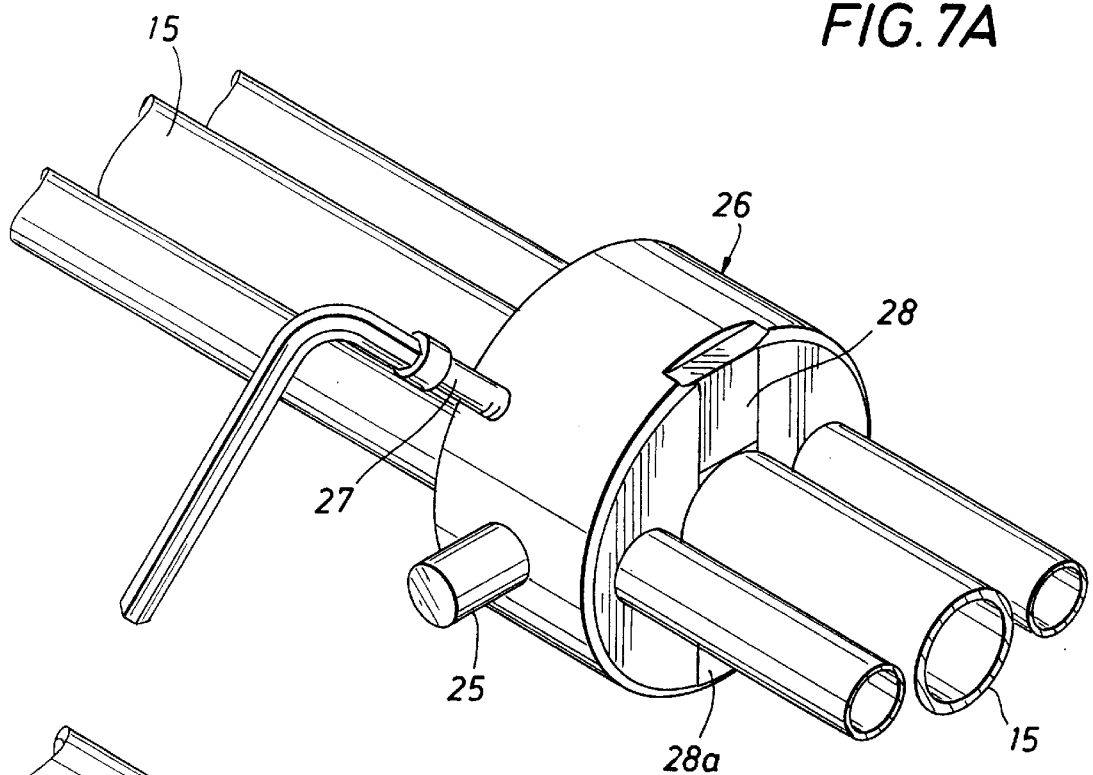
FIG. 7A is an isometric view of the adjustable tank mounting collar/calibration block of the tool of FIG. 4.
Figure 7B:
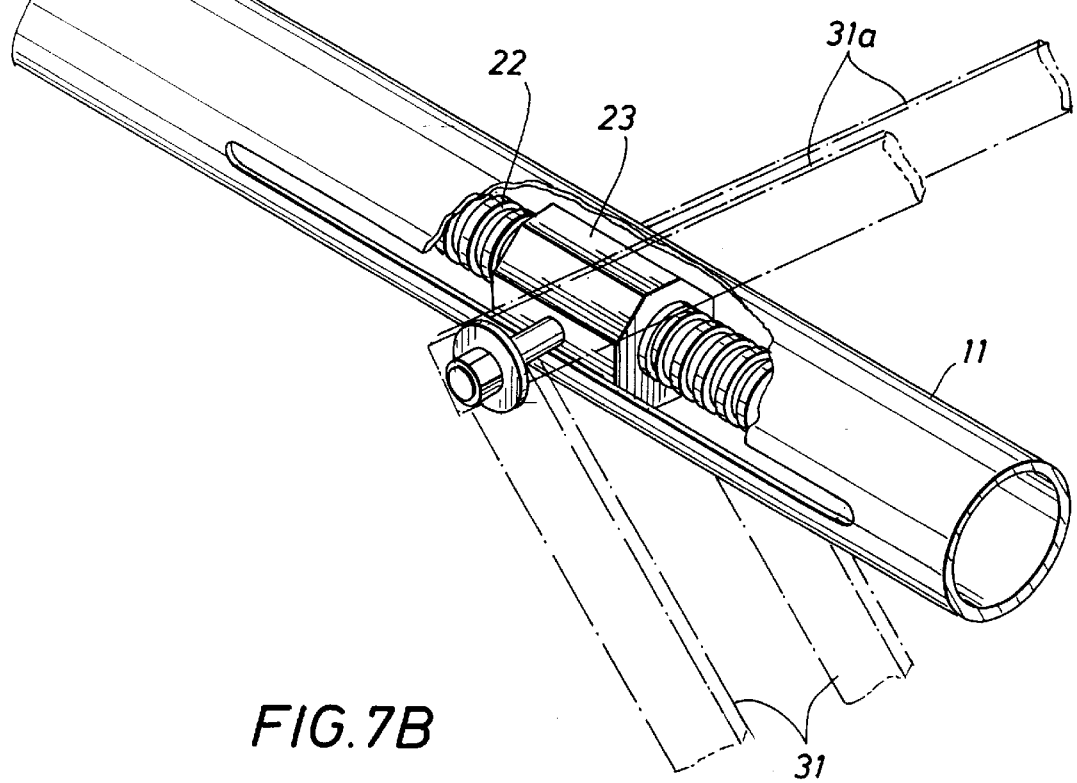
FIG. 7B is an isometric view of the length-adjusting mechanism of the arms of the tool of FIG. 4.
Figure 7C:
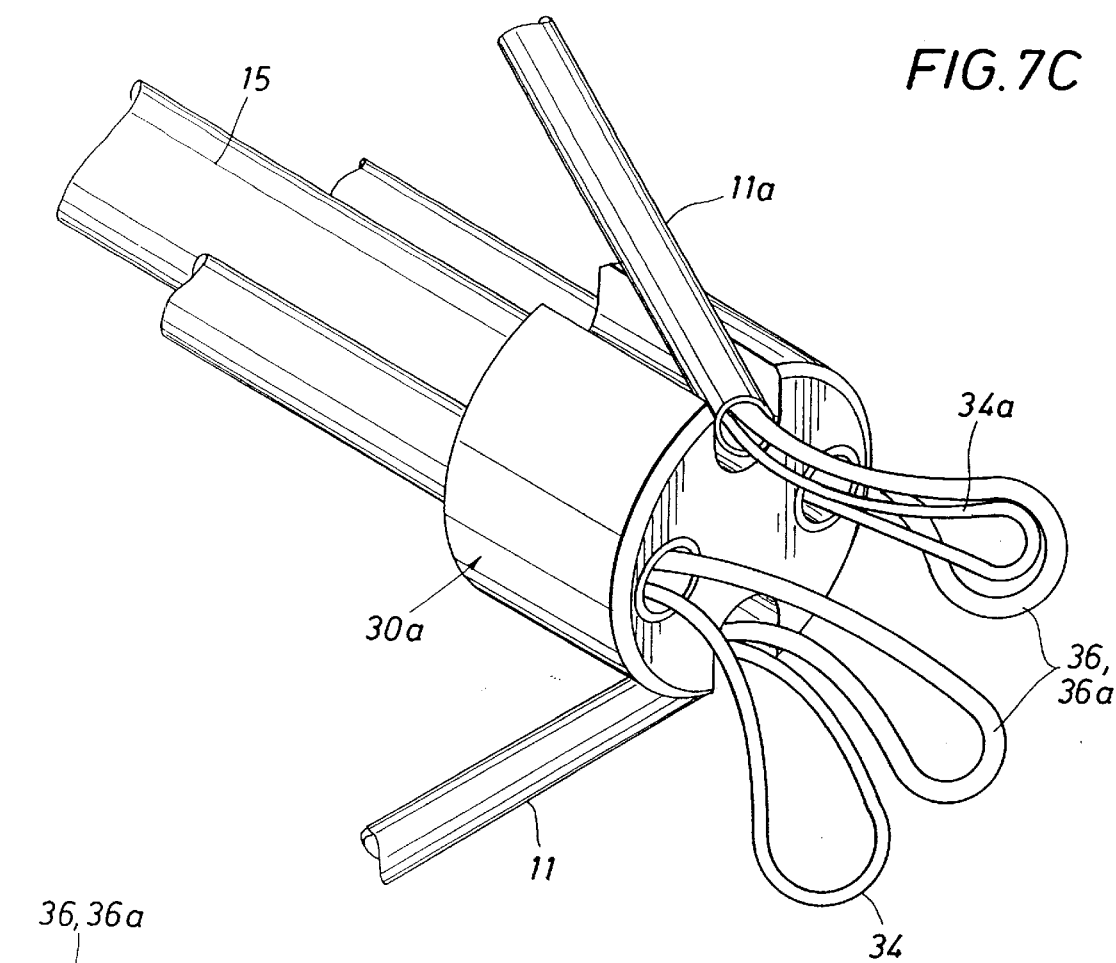
FIG. 7C is an isometric view of the hinged end of the tool of FIG. 4.
Figure 7D:
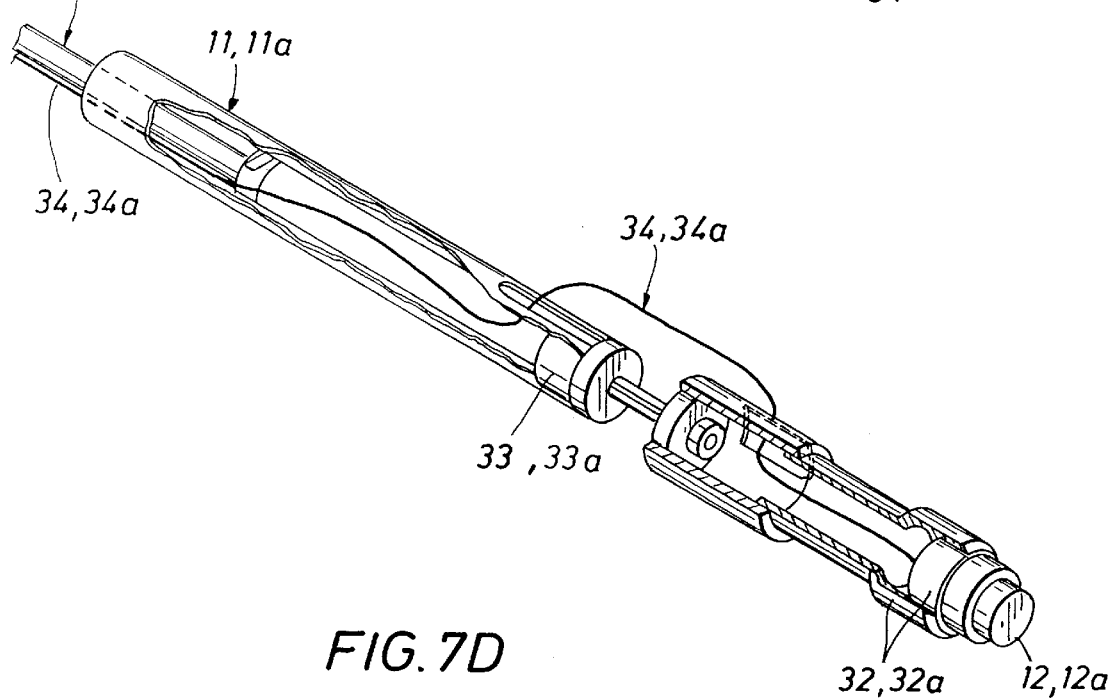
FIG. 7D is an isometric view of the pneumatic adjustment mechanism and transducer assembly of the tool of FIG. 4.

Prior to insertion of the tool 10 in the tank 50, the transducers 12, 12a and the ultrasonic flaw detector 16 must be calibrated as a unit. For calibration, calibration blocks 28, 28a comprising pieces of fiberglass (FRP sample) of known thickness (e.g., 0.250 inch) are embedded into diametrically opposing lower surfaces of the tank mounting adjustable collar 26 (see FIG. 7A) to provide a reference for calibrating the time-of-flight measurement. (It will be appreciated that the FRP saample could be hand-held during calibration.) The tool 10 is calibrated on each transducer 12, 12a before being inserted into the tank 50. To calibrate the tool 10, the tank mounting adjustable collar 26 (see FIG. 7A) is moved to a position along center shaft 15 which is near the transducers 12, 12a. The transducers 12, 12a are wetted with a couplant and then pressed against the respective calibration block 28, 28a of collar 26 by applying gas pressure to the gas actuator (FIG. 7D) from the gas, or preferably nitrogen, supply 17. The corresponding time-of-flight is then measured.

Figure 2:
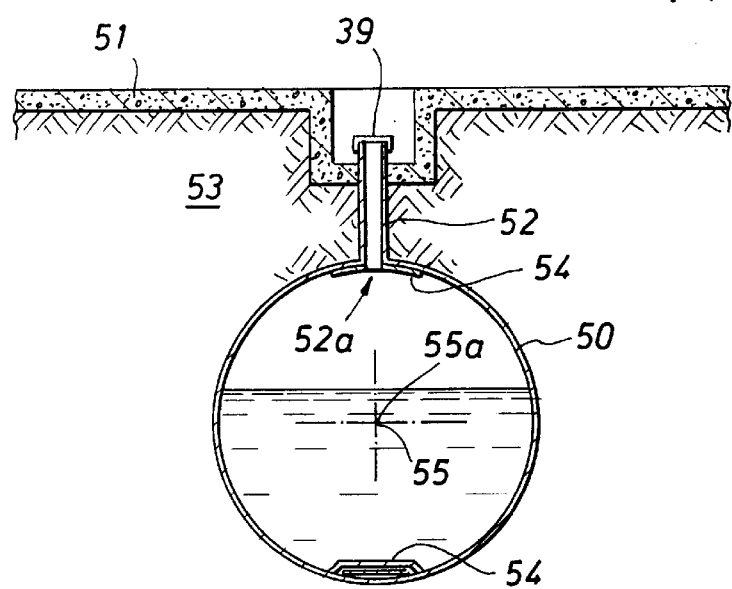
FIG. 2 is an elevation view of the tank taken along the line 2—2 of FIG. 1.
Figure 3:
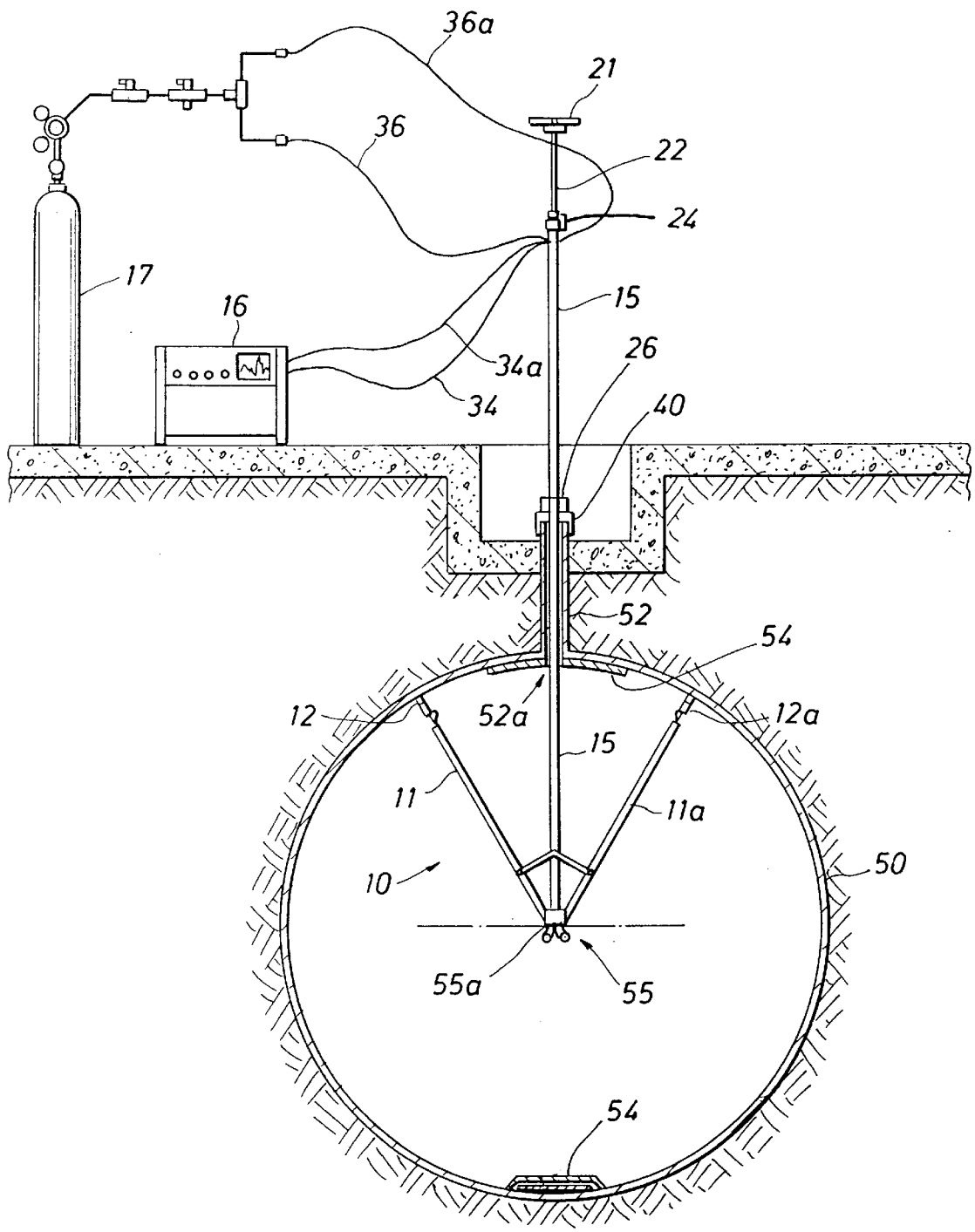
FIG. 3 is a view of FIG. 2 with the tool of the present invention in place for measurements and with the equipment required for measurement.
Figure 4:
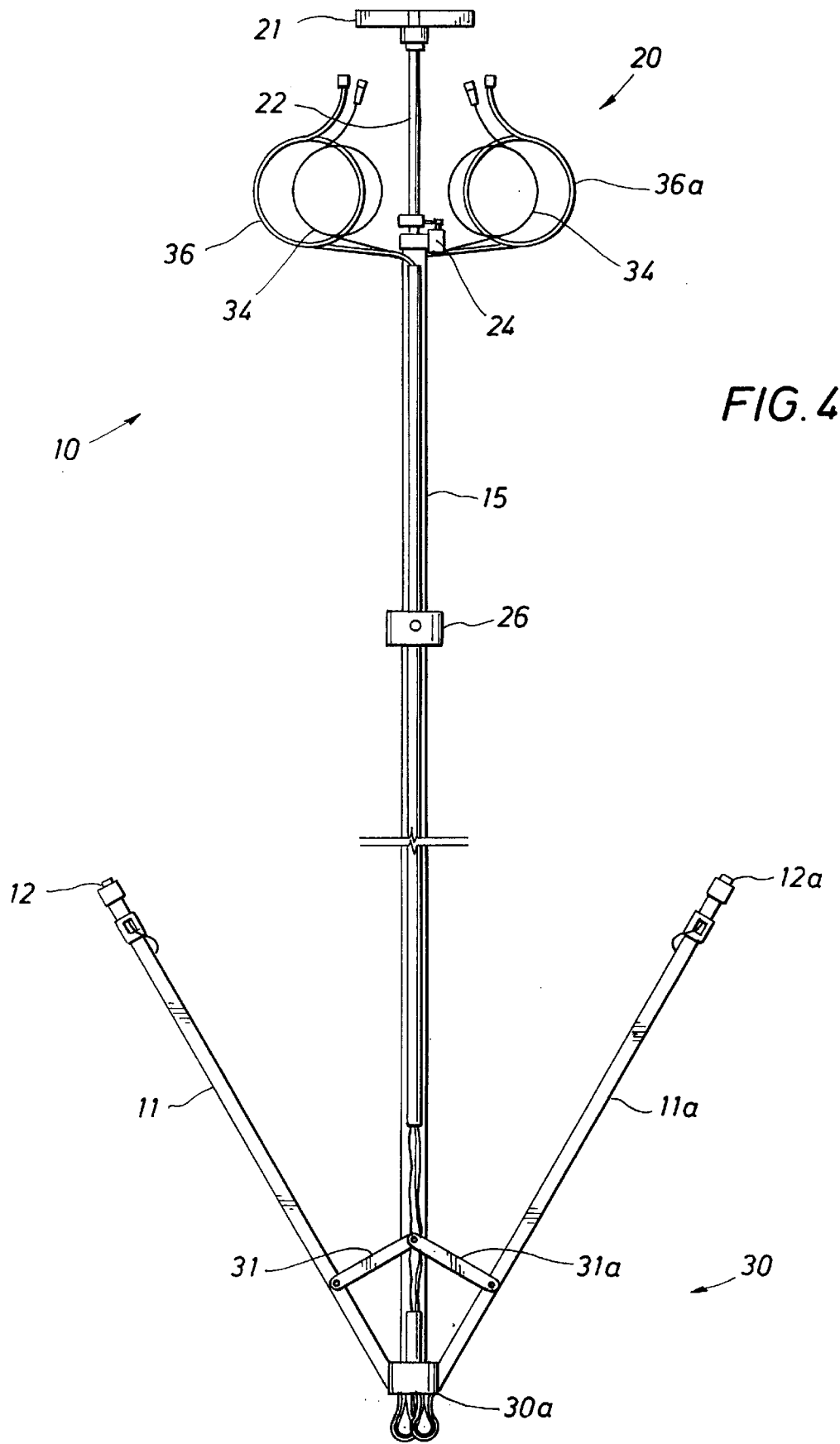
FIG. 4 is a schematic view of the tool.

Referring now to FIG. 2, which is a cross-sectional view of the tank 50 (without the tool 10 in place) taken through the fill nozzle 52, the thickness measurements are taken on the tank 50 wall near the fill nozzle 52 interface 52a but away from the reinforced area 54. This allows the transducers 12, 12a to avoid being immersed in gasoline, which could cause them to deteriorate. It also allows use of a tool 10 that only requires a small movement (e.g., 15–30 degrees) away from the fill nozzle 52 interface 52a as shown in FIG. 3. The tank wall immediately around the fill nozzle 52 (i.e., the interface 52a) is reinforced with extra fiberglass 54 for strength, so the measurements of the representative tank 50 wall thickness must be taken with the arms 11, 11a of the tool 10 at about 15 degrees or more from vertical in order to avoid the reinforced area 54. The tool 10 is designed to take measurements within a range of about 15 to 30 degrees from vertical.

Figures 5, 6:
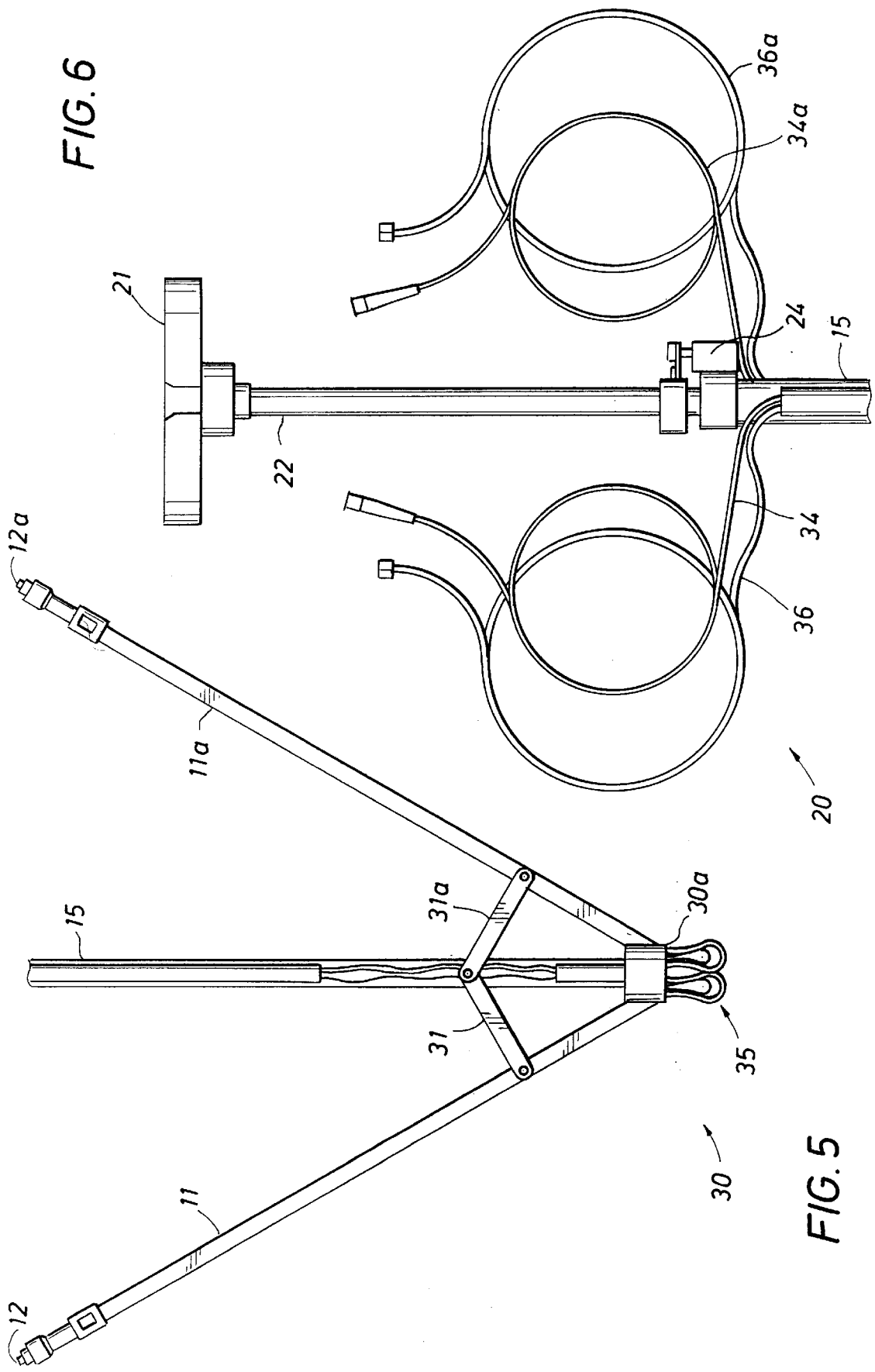
FIG. 5 is an enlarged view of the hinged end of the tool of FIG. 4.
FIG. 6 is an enlarged view of the operational end of the tool of FIG. 4.

Referring now to FIG. 3, which shows the sectional view of FIG. 2 with the measurement apparatus and equipment in place, the tool 10 comprises two arms 11, 11a that can be pivoted away from the center shaft 15 and from the fill nozzle 52 interface 52a after they are inserted into the tank 50 and clear the fill nozzle 52 interface 52a. All storage tanks 50 have a diameter of 8-feet so a single arm length 11, 11a of about 4-feet suffices for all of the measurements. A transducer 12, 12a is mounted on the upper end of each arm 11, 11a. The arms 11, 11a are hinged (shown generally at 30, see FIGS. 4 and 5) near the bottom of the center piece 15 of the tool 10. During measurement, the base 30a of hinged end 30 is positioned directly below the fill nozzle 52 approximately at a point 55a on the longitudinal axis 55 of the tank 50 so that the opposite ends of the arms 11, 11a, where the transducers 12, 12a are mounted, will follow the curvature of the tank 50 wall as they are pivoted away from the fill nozzle 52 interface 52a. Each arm 11, 11a is slightly shorter than the tank 50 radius so that they will clear the tank wall as they are pivoted. The transducers 12, 12a are mounted in ball joints 32, 32a (see FIG. 7D) attached to the end of pneumatic pistons 33, 33a. The pistons are actuated with a gas such as nitrogen or air from the supply 17 in order to push the transducers 12, 12a against the wall with a controlled pressure after the arms 11, 11a are positioned in the desired measurement position. The ball joints 32, 32a are mounted to allow a modest degree of rotational freedom so that the ultrasonic transducers 12, 12a will seat flat against the tank wall and provide good acoustic coupling. The pistons 33, 33a are spring-loaded so that when the gas pressure is removed from the pistons 33, 33a, the pistons retract from the wall and the arms 11, 11a can be pivoted to another position.

Nitrogen is preferably used instead of air to avoid the risk of creating a flammable atmosphere inside the tank 50 in the event that there is a leak from the pneumatic gas line 36, 36a inside the tank. Even though the atmosphere inside the tank 50 is in the over-rich region of gasoline vapor (too rich to be flammable), if a gas (air) leak should develop, the area immediately around the leak might be in the flammable range.

The transducers 12, 12a are equipped with coaxial cables 34, 34a to carry the ultrasonic flaw detector 16 signal to and from the surface 51. The cables 34, 34a are potted into the transducers 12, 12a to eliminate the possibility of generating an electrical spark that could ignite the vapor inside the tank 50. The cables 34, 34a run down the arms 11, 11a to the hinged end 30 and then up the center tube 15 to the surface 51. A loop, shown generally at 35, is formed in each cable 34, 34a (and each pneumatic line 36, 36a) at the hinged end 30 to allow the cables to bend freely without excessive stress. The lower end of the cables (at the loops 35) may, during the course of use, be immersed in the fuel, depending on the level in the tank 50. Therefore, to prevent deterioration from exposure to fuel, the cables 34, 34a are enclosed in a fluorocarbon polymer such as TEFLON® tubing. The TEFLON® tubing is terminated about 6-inches from the end of the cables 34, 34a at the transducer end to maximize flexibility where the cable passes through a bend into the air-adjustable foot (see FIG. 7D). The transducers 12, 12a, including 40-feet of cable potted into each transducer and enclosed in TEFLON® tubing are purchased as a single unit from Krautkramer Branson, part number 389-018-341.

The arms 11, 11a are extended or retracted (pivoted around hinged end 30) by turning a handwheel or crank 21 at the top of the tool 10. The crank 21 is attached to a threaded rod or screw 22. A threaded nut or bushing 23 (see FIG. 7B) is mounted on the threaded rod 22 and is pivotally attached to extender arms 31, 31a (see FIGS. 4 and 5) which are pivotally attached to the main arms 11, 11a. As the screw 22 is turned, the nut 23 moves up or down, the extender arms 31, 31a pivot in or out and cause the main arms 11, 11a to pivot in or out. The threaded rod (screw) 22 is equipped with a turn (or revolution) counter 24 located at the surface end of the tool 10 to keep track of the main arm 11, 11a positions. The screw 22 is preferably stainless steel with No. 4 pitch Acme thread. The mating nut 23 is made of brass to prevent galling.

Measurements are taken from both transducers 12, 12a at three or so angular positions with the main arms 11, 11a being at angles between 15 and 30-degrees from vertical (e.g., 15, 22 ½ and 30-degrees). The plane of the arms 11, 11a is perpendicular to the longitudinal axis 55 of the tank. An orientation pin 25 is mounted on the surface of the calibration block/tank mounting collar 26 to assure the proper orientation of the arms 11, 11a. A special fitting or locking cap 40 (see FIGS. 3 and 8) is provided to replace the service cap 39 and to mate with the fill nozzle 52. Thumbscrews 27 are provided to attach the tool 10 to the locking cap 40 so that it stays firmly in place without rotating or slipping. The locking cap 40 is preferably made from brass to minimize the possibility of impact sparks.

Most of the tool is made from aluminum to keep the weight as low as possible.

The procedure for using the tool is as follows (NOTE: Appropriate grounding procedures should be used throughout.):

I. CALIBRATING THE TOOL (1) Lay the tool 10 on the ground and connect the ultrasonic flaw detector 16 and gas bottle 17 by means of the coaxial cables 34, 34a and the pneumatic lines 36, 36a, respectively.

(2) Calibrate the tool 10 and ultrasonic flow detector 16 as previously described.

(3) Disconnect the tool 10 from the ultrasonic flaw detector 16 for safety, so that no electric power is applied until after the tool 10 is positioned in the tank.

II. INSERTING THE TOOL INTO THE TANK FOR MEASUREMENTS (4) Ground the locking cap 40 to the fill nozzle 52 with a grounding clip (not shown). This is a safety measure to prevent a static spark discharge when inserting the tool 10 into the fill nozzle 52. Remove the service cap 39 from the fill nozzle 52. Attach the locking cap 40 to the fill nozzle 52. Measure the length of the fill nozzle 52, for example by using a type of tape measure that has a small hook on the end of the tape.

(5) Apply additional couplant to the transducers 12, 12a. Insert the tool 10 into the fill nozzle 52. Position the tank mounting collar 26 so that the transducers 12, 12a are approximately one inch below the bottom of the fill nozzle 52. Using the locating pin 25 on the tank mounting collar 26 (see FIG. 7A), rotate the tool 10 so that the pin 25 is lined up with the tank longitudinal axis 55, i.e., so that the arms are perpendicular to the longitudinal axis of the tank.

(6) Connect the ultrasonic flaw detector 16 and gas bottle 17 to the tool 10.

III. TAKING MEASUREMENTS (7) Turn the handwheel 21 so that the arms 11, 11a are 15-degrees from vertical, using prior calibration of the turn counter 24 to set the position.

(8) Activate the gas supply 17 to press the transducers 12, 12a against the tank wall. Take a thickness reading with the ultrasonic flaw detector 16. Remove the gas pressure so the pistons 33, 33a will retract.

(9) Move the arms 11, 11a to a wider angle and repeat step 8. Repeat this step at several positions up to 30-degrees.

IV. REMOVING THE TOOL FROM THE TANK

(10) Retract the arms 11, 11a fully. Disconnect the ultrasonic flaw detector 16 and gas bottle 17 from the tool 10. Withdraw the tool 10 from the tank 50. Remove the ground clip from the tool 10. Attach the ground clip between the locking cap 40 and the fill nozzle 52. Remove the locking cap 40. Remove the ground clip. Replace the original nozzle service cap 39.

While the above description has been made with respect to a preferred embodiment, other embodiments are envisioned. The tank could also be made of other materials such as steel. Digital techniques are preferred where metal corrosion measurements are desired. Likewise, other measurement techniques, i.e., microwave interferometry, may be used for measuring the thickness of fiberglass-reinforced plastic tanks.

Microwave interferometry was first used to detect thickness of, and defects in, nonmetallic radar domes in the 1940's. To use a microwave interferometery technique, the dielectric properties of the fiberglass composite material must first be determined. The apparatus would most conveniently consist of a single antenna (sensor) operating in a reflectance mode and a suitable microwave dielectric analyzer. Such products are commercially available from, for example, KDC Technology Corporation of Livermore, Calif. The microwave technique would involve sweeping the microwave frequency to determine the reflection resonance response. The reflection resonance response may be calibrated to the specimen thickness by testing, in the laboratory, standard samples of known and varied thicknesses; the standard samples being of similar dielectric properties to the tank material.

We claim:

1. A tool for measuring the thickness of the walls of underground storage tanks wherein said storage tanks include a nozzle extending to the earth's surface, comprising:

a center shaft for providing support, said center shaft being hollow;

a pair of arms pivotally hinged at one end of said center shaft, said pair of arms being mounted on diametrically opposing sides of said center shaft, each of said opposing arms having a length approximately equal to the radius of said tank and being adapted to extend along said center shaft in a calibration and an insertion position and to pivot to form an angle with respect to said center shaft and wherein said tool is adapted to be inserted through said nozzle when folded in said insertion position;

a transducer mounted on the ends of said pair of arms and adapted to be placed in contact with said tank wall;

a screw located within said center shaft and extending the length thereof for positioning said pair of arms either along said center shaft or at an angle with respect thereto;

a handwheel connected to said screw and being located at the unhinged end of said center shaft for turning said screw to thereby extend or retract said pair of arms with respect to said center shaft;

a counter for counting the number of revolutions of said handwheel, said number of revolutions corresponding to the angle of said pair of arms with respect to said center shaft;

a pneumatic piston located in each of said pair of arms and connected respectively to each of said transducers for moving said transducers into contact with said wall of said tank;

pneumatic tubes extending through said center shaft and through said pair of arms, said pneumatic tubes adapted to actuate said pistons for moving said transducers into contact with said tank wall;

instrumentation cables extending through said center shaft and through said pair of arms, said instrumentation cables being connected to said transducers for supplying and receiving electrical pulses to and from, respectively, said transducers; and a calibration and support block for fixedly connecting said tool to said nozzle and for positioning said hinged end thereof at a point approximately at the longitudinal axis of said tank and for providing calibration means for calibrating said transducers.

2. The tool of claim 1 wherein said pivotally hinged arms are adapted to form an angle with respect to said center shaft of up to about 30 degrees.

3. The tool of claim 1 further including means connected to said instrumentation cables for supplying electrical pulses to said transducers and for receiving electrical pulses therefrom.

4. The tool of claim 3 wherein said means is an ultrasonic flaw detector.

5. The tool of claim 3 wherein said means is a microwave generator and receiver.

6. The tool of claim 1 further including a gas supply connected to said pneumatic lines for supplying a gas thereto.

7. The tool of claim 6 wherein said gas is nitrogen.

8. The tool of claim 6 wherein said gas is air.

9. The tool of claim 1 wherein said storage tank is constructed of fiberglass-reinforced plastic.

10. The tool of claim 1 wherein said storage tank is constructed of steel.

11. A method for determining the thickness of the walls of underground storage tanks wherein said storage tanks include a nozzle extending to the earth's surface, comprising the steps of:

proviting a tool having a pair of arms pivotally hinged at one end of a center shaft, said pair of arms being mounted on diametrically opposing sides of said center shaft, each of said opposing arms having a length approximately equal to the radius of said tank and being adapted to extend along said center shaft in a calibration and an insertion position and to pivot to form an angle with respect to said center shaft;

inserting said tool through said nozzle when said tool is folded in said insertion position;

pivoting said pair of arms to form an angle with respect to said center shaft;

determining the angle of said pair of arms with respect to said center shaft;

forcing transducers mounted on the ends of said pair of arms into contact with said wall of said tank;

supplying electrical pulses to said transducers;

receiving return pulses from said transducers;

measuring the time difference between a selected supplied pulse and a selected return pulse; and determining the thickness of said wall from said time difference between said supplied pulse and said return pulses.

12. The method of claim 11 wherein said storage tank is constructed of fiberglass-reinforced plastic.

13. The method of claim 11 wherein said storage tank is constructed of steel.

* * * * *